(12) United States Patent
Wei et al.

(10) Patent No.: US 11,847,718 B2
(45) Date of Patent: Dec. 19, 2023

(54) PER-WINDOW DIGITAL WATERMARK FOR DESKTOP APPLICATIONS

(71) Applicant: VMware, Inc., Palo Alto, CA (US)

(72) Inventors: Yuping Wei, Beijing (CN); YiQun Yun, Beijing (CN); Yuan Ma, Beijing (CN); Hao Bai, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/412,064

(22) Filed: Aug. 25, 2021

(65) Prior Publication Data

US 2023/0018279 A1 Jan. 19, 2023

(30) Foreign Application Priority Data

Jul. 15, 2021 (WO) .............. PCT/CN2021/106518

(51) Int. Cl.
*G06T 1/00* (2006.01)
*G06F 9/451* (2018.01)
(Continued)

(52) U.S. Cl.
CPC .......... *G06T 1/0071* (2013.01); *G06F 3/0481* (2013.01); *G06F 9/452* (2018.02); *G06F 9/45558* (2013.01); *G06F 21/16* (2013.01)

(58) Field of Classification Search
CPC .... G06F 3/04845; G06F 3/0482; G06F 9/452; G06F 9/45558; G06F 2009/45595; G06F 21/16; G06F 21/10; G06F 3/04886; G06F 3/0484; G06F 3/14; G06F 21/6245; G06F 3/1454; G06F 2221/0733; G06F 9/451;
(Continued)

(56) References Cited

U.S. PATENT DOCUMENTS

| 5,874,960 A | * | 2/1999 | Mairs ..................... G06F 3/1462 715/733 |
| 6,437,803 B1 | * | 8/2002 | Panasyuk ................ G06F 9/451 715/750 |

(Continued)

FOREIGN PATENT DOCUMENTS

WO    WO-2019201077 A1 * 10/2019  ............. G06F 21/16

OTHER PUBLICATIONS

"Miregion.c", retrieved from "https://gitlab.freedesktop.org/xorg/xserver/blob/5f382c9c7fbda6eccf8e76c28a90b55ff2f0aef3/mi/miregion_c" on Aug. 25, 2021.

*Primary Examiner* — Nicholas Ulrich

(57) ABSTRACT

Embodiments are described for placing a watermark over application windows in a desktop. For each application window that is opened in the desktop, the system can determine whether the application requires a watermark, for example, based on a predefined list that specifies which applications require watermarks. For each application window that requires a watermark, a uncovered watermark region can be calculated where the watermark will appear. An overlay can be placed over the application windows, for example in a top-level window that does not receive mouse and keyboard inputs, and the watermark can be drawn in the overlay over the location of the uncovered watermark region of each application. As a result, watermarks can be placed over a plurality of specified application windows in an efficient and convenient manner.

20 Claims, 9 Drawing Sheets

(51) Int. Cl.
*G06F 3/0481* (2022.01)
*G06F 9/455* (2018.01)
*G06F 21/16* (2013.01)

(58) Field of Classification Search
CPC .............. G06F 21/6263; G06F 3/0481; G06F 2203/04804; G06F 21/62; G06F 3/048; G06F 21/606; G06F 21/604; G06F 21/602; G06F 21/6281; G06F 21/629; G06F 21/60; G06T 1/0071; G06T 1/0021; G06T 1/0028; G06T 2201/0051; G06T 2201/0061; G06T 2200/24; G06T 1/0064; G06T 2201/005; G06T 15/405; H04L 67/10; H04L 2209/608; H04L 67/125; G06V 10/22; G06V 10/26
See application file for complete search history.

(56) References Cited

U.S. PATENT DOCUMENTS

| | | | | |
|---|---|---|---|---|
| 6,636,248 | B1* | 10/2003 | Christensen | G06F 3/0481 715/837 |
| 10,002,255 | B2* | 6/2018 | Chang | G06F 21/84 |
| 10,025,938 | B2* | 7/2018 | Krishnamurthi | G06F 21/32 |
| 2006/0005187 | A1* | 1/2006 | Neil | G06F 9/455 718/1 |
| 2006/0230156 | A1* | 10/2006 | Shappir | G06F 3/1454 709/227 |
| 2008/0005694 | A1* | 1/2008 | Abdo | G06F 9/451 715/794 |
| 2008/0025645 | A1* | 1/2008 | Jakobson | G06F 21/84 382/300 |
| 2012/0226742 | A1* | 9/2012 | Momchilov | G06F 3/1454 709/203 |
| 2012/0255029 | A1* | 10/2012 | Kim | G06F 21/10 726/26 |
| 2013/0139103 | A1* | 5/2013 | Laborczfalvi | G06F 3/0481 715/781 |
| 2014/0176562 | A1* | 6/2014 | Somerfield | G06T 11/00 345/443 |
| 2015/0365498 | A1* | 12/2015 | Agrawal | G06F 21/606 709/203 |
| 2016/0006803 | A1* | 1/2016 | Kumar | H04L 67/1091 719/329 |
| 2016/0231869 | A1* | 8/2016 | Kumar | H04N 19/17 |
| 2016/0253772 | A1* | 9/2016 | Kofod | G06T 1/0021 382/100 |
| 2017/0352172 | A1* | 12/2017 | Lim | G09G 5/397 |
| 2019/0156452 | A1* | 5/2019 | Dawood | G06F 3/1454 |
| 2019/0279344 | A1* | 9/2019 | Duggal | G06V 20/635 |
| 2019/0340341 | A1* | 11/2019 | Fleck | H04L 63/04 |
| 2020/0151348 | A1* | 5/2020 | Chauhan | G06F 21/62 |
| 2020/0302029 | A1* | 9/2020 | Holm | G06K 9/6273 |
| 2021/0056183 | A1* | 2/2021 | Zhou | H04N 1/32325 |
| 2023/0041678 | A1* | 2/2023 | Swierk | G06F 21/16 |

\* cited by examiner

PER-WINDOW DIGITAL WATERMARK FOR DESKTOP APPLICATIONS

CLAIM OF PRIORITY

This application is based upon and claims the benefit of priority from International Patent Application No. PCT/CN2021/106518, filed on Jul. 15, 2021, which is incorporated by reference herein in its entirety.

TECHNICAL FIELD

The present disclosure generally relates to user applications on computing devices and more specifically to techniques for producing visual watermarks on application windows on computing devices and in virtual desktop environments.

BACKGROUND

Initially conceived for use on paper documents, the concept of watermarking has made its way extensively into electronic documents. For many years, various computer applications have contained features allowing placement of a watermark over an electronic document to convey certain information to users viewing the document on a display or in a printout. Generally, such watermarks contain text and/or graphics to convey information such as confidentiality notices, copyrights, trademarks, etc., in a way that still permits the user to digest the content, such as by making the watermark semi-transparent.

However, for many enterprises the nature of business requires frequent placement of watermarks on content viewed by users on enterprise devices. For example, such enterprises may be working with sensitive content, such as financial information, patient medical data, etc. In such environments, an IT administrator may wish to add digital watermarks to the content being viewed by employees in order to deter malicious users from disseminating confidential or sensitive information or to simply prevent inadvertent placement of such information at risk. Watermarks are often encoded with unique identifying information, such as user ID, session ID, IP address, and the like, which can be used to track the source of information leakage or for other security-related purposes. However, watermarking all content containing sensitive information can present a significant burden. Furthermore, various applications that handle sensitive data in the enterprise may not have a watermarking feature.

Some solutions attempt to address this problem by placing a watermark over the entire graphical user interface of computing devices. With such solutions, a watermark appears over the entire screen, thus watermarking all content viewed on the device. However, while this approach ensures that all sensitive content viewed on the device is watermarked, it also results in applications that do not need to be watermarked receiving a watermark, as well as in portions of the interface, such as menus, backgrounds, etc. being watermarked. All of this results in a less than ideal user experience.

What is needed is a more efficient way for placing watermarks on desktop application windows.

DETAILED DESCRIPTION

Figure 1:
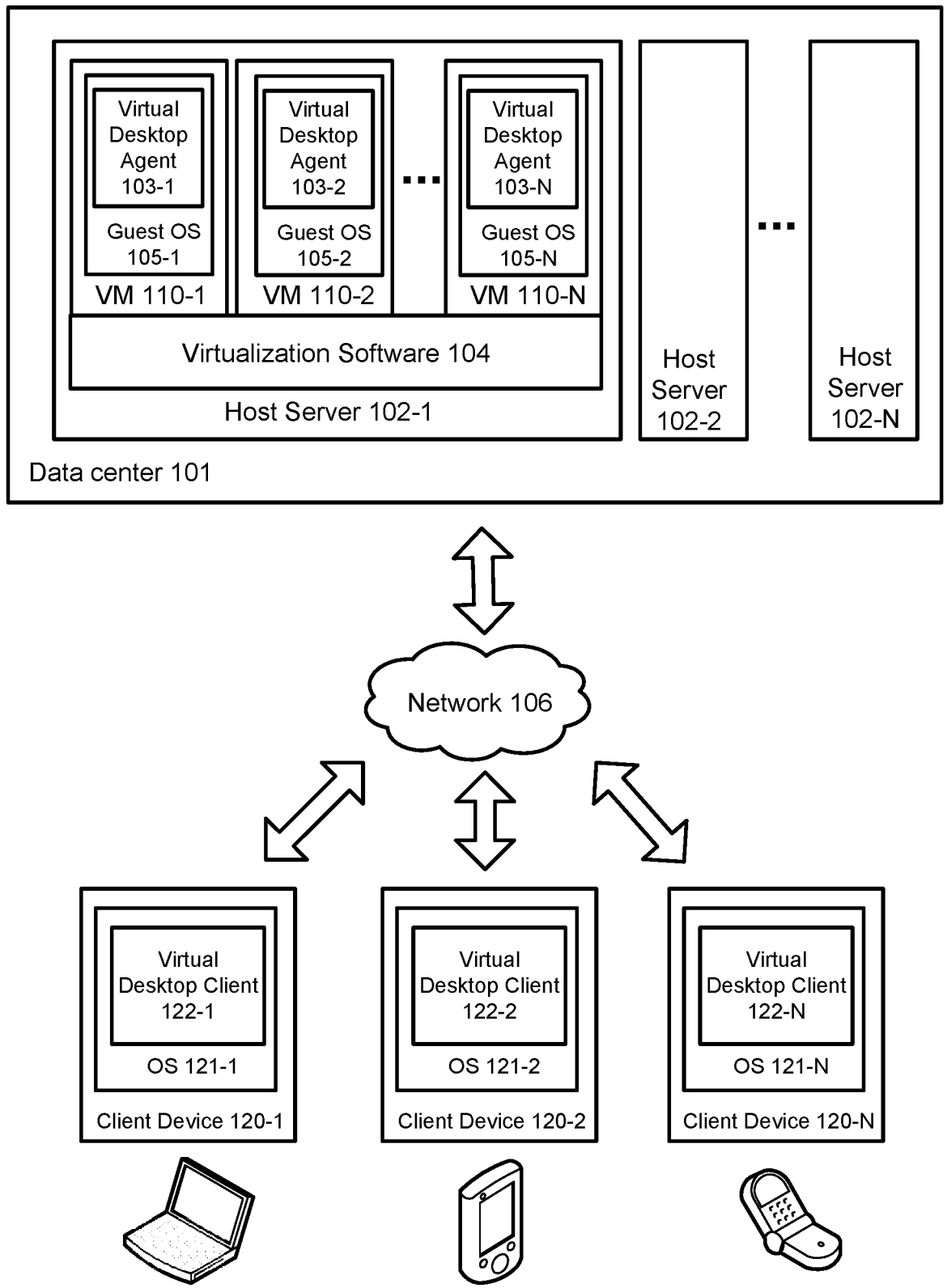
FIG. 1 illustrates an example of a virtual desktop environment, in accordance with various embodiments.

Systems and methods in accordance with various embodiments of the present disclosure overcome at least some of the above-mentioned shortcomings and deficiencies by providing more efficient ways to place watermarks over application windows on computing devices. In particular, embodiments described herein leverage an overlay that is placed above application windows in a desktop graphical user interface (GUI), in which a watermark can be drawn over corresponding locations of application windows that require a watermark.

In various embodiments, for each application window that is opened in the desktop, the system can determine whether the application requires a watermark, for example, based on a predefined list that specifies which applications require watermarks. For each application window that requires a watermark, a uncovered watermark region can be calculated where the watermark will appear. An overlay can be placed over the application windows, for example in a top-level window that does not receive mouse and keyboard inputs, and the watermark can be drawn in the overlay over the location of the uncovered watermark region of each application. As a result, watermarks can be placed over a plurality of specified application windows in an efficient and convenient manner.

In various embodiments, the invention can be implemented in traditional or "local" desktops, where applications run on the user device, or the invention can be implemented in remote or virtual desktops, where applications run remotely with respect to the user. As used throughout this disclosure, the term "desktop" may refer to either a local desktop or a remote desktop, as may be dictated by the context. In the context of remote desktop environments, as used throughout this disclosure the terms "desktop", "remote desktop", and "virtual desktop" are used interchangeably and refer to an instance of an operating system and/or applications that run(s) remotely with respect to the user. Virtual desktops can be provided as part of various remote desktop virtualization offerings, such as virtual desktop infrastructure (VDI), desktop as a service (DAAS), or remote desktop services (RDS).

For example, in a conventional remote desktop environment, each virtual desktop corresponds to a computing environment provided by a virtual machine (VM) executed on a host server (i.e., a host computing device) that is physically located in a remote datacenter. Each host server may host any number of virtual machines (e.g., tens, hundreds, etc.) and each virtual machine may be owned by an individual user and in some types of deployments such as RDS the virtual machine may be shared among users. The virtual machine typically includes a guest operating system (e.g., Windows) capable of executing applications for the user or users and the virtual machine is used to provide a virtual desktop for the users or individual user, as the case may be. The user who owns the virtual desktop can remotely log into his or her virtual desktop using a client device that establishes a network connection (e.g., Wide Area Network connection) with the host server and remotely execute various applications on the virtual machine as if the desktop were running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote desktop protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1.

In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a standalone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

As mentioned, FIG. 1 illustrates an example of a virtual desktop environment that may be a VDI or DAAS environment. Various other approaches can be implemented for providing virtual desktops and the invention is not limited to any particular approach. For example, in some remote desktop environments, such as in RDS, a virtual machine running on a server may be shared by multiple users. Each user may be provided with a separate virtual desktop session on the same VM while the users may share the operating system and/or applications running on the VM. In this approach, the operating system on the VM can be a server operating system such as Windows Server, available from Microsoft Corporation. Similar to the example of FIG. 1, multiple VMs may be hosted on each host server in the datacenter via virtualization software, and in some embodiments a single VM can be hosted on each host server. Unlike the example of FIG. 1, however, in this type of deployment each VM can host multiple virtual desktop sessions. Similar to the example of FIG. 1, an agent executing in the VM (e.g., in the operating system) can convey outputs from each desktop (e.g., GUI data) to a client running on a user device while user inputs are conveyed from the client to the agent in a similar fashion as described in the example of FIG. 1. In this case, however, an agent operating in a VM may be used to service multiple virtual desktop sessions on the VM.

In various embodiments, virtual desktop environments can be configured to provide users with different scopes of functionality, such as to provide virtualized applications. In this case, users can be provided access to one or more applications running in a virtual desktop but not to other aspects of the computing environment, such as other applications and the operating system. A user can interact with the virtualized application using a client running on the user device that communicates with a server-side agent in a similar way as when a user interacts with an application in a virtual desktop as described above, except access can be limited, for example to only the virtualized application. It should be noted that, as the terms are used herein, a virtualized application is a type of remote desktop, as applicable. Similarly, a session on a virtualized application is a session on a remote desktop.

As described previously, particularly in sectors where sensitive information is commonly handled by employees, such as finance and healthcare, enterprises may wish to add digital watermarks to the content being viewed by employees in order to deter malicious users from disseminating confidential or sensitive information or to simply prevent inadvertent placement of such information at risk. The digital watermark may contain various generic information, such as notices (e.g., confidentiality notices), company logos, and so on and/or information about the user and the session. For example, the watermark may contain the user's login name, user ID, session ID, the client IP address, the connection time, and the like. Such information can be used by the enterprise to track the source of information leakage or for other security-related purposes. Additionally, the watermark provides a reminder to the users that the enterprise can track their actions.

Generally, the watermark can be a semi-transparent graphic and/or text that is placed over content in a repeated pattern so as to allow the user to comfortably digest the content beneath. Watermarks that are invisible to the human eye can also be utilized. In this case, a special tool or application can be used to read the watermark (e.g., from a screen capture or a screenshot). For example, the Desktop Watermarks available from VMware, Inc. allow adding visible watermarks to desktops in virtual desktop infrastructure as well as invisible watermarks that require a special tool to read.

However, enterprises face various challenges for watermarking content on user devices in the enterprise. One previous solution to address this need is the watermarking feature in the VMware Horizon platform for delivering virtual desktops and applications, available from VMware, Inc. This product enables the placement of a watermark over the entire GUI of the virtual desktop, which poses various disadvantages as discussed above.

Figure 2:
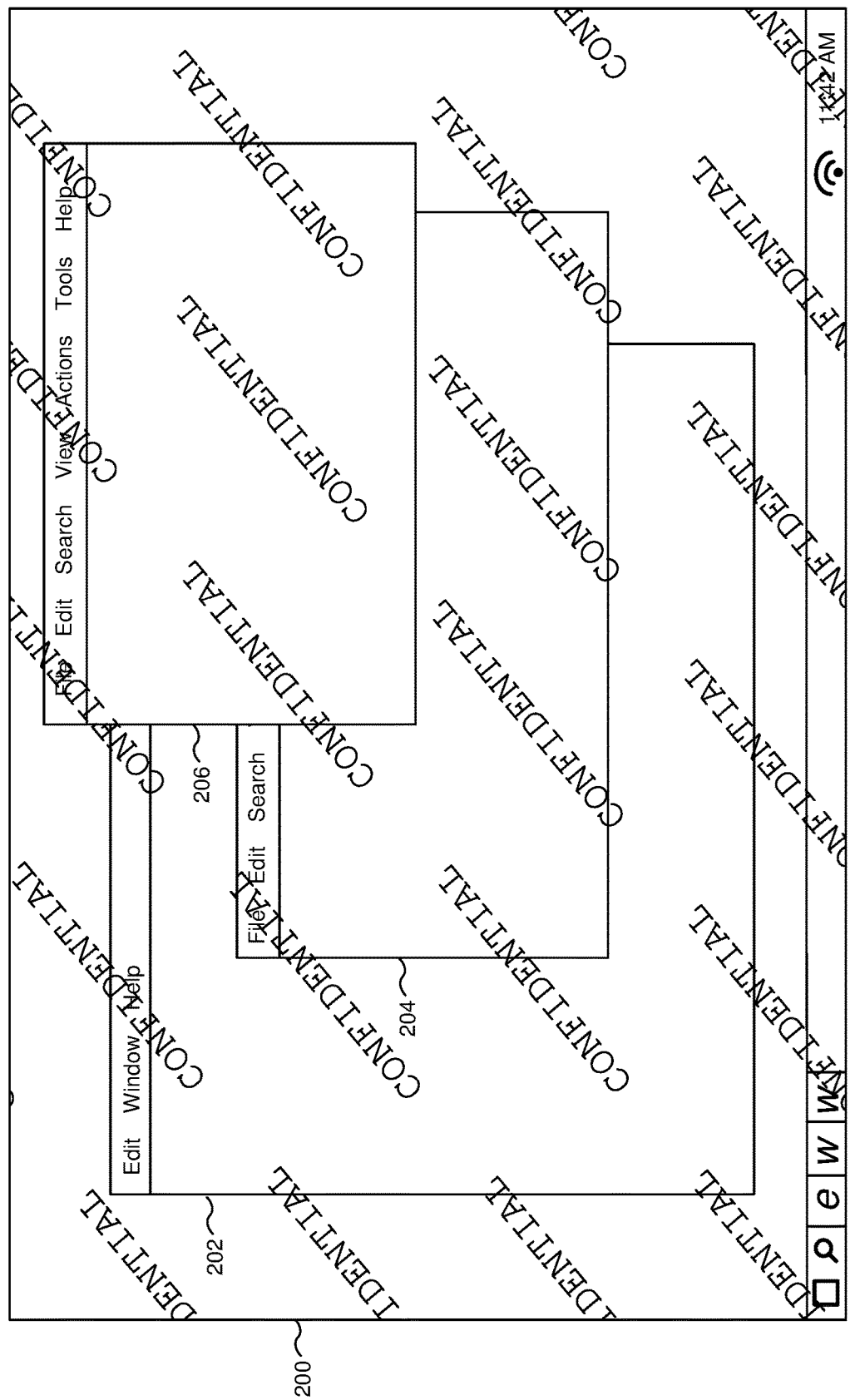
FIG. 2 illustrates an example of a watermark placed over an entire GUI of a computing device.

FIG. 2 illustrates an example of a watermark placed over an entire GUI of a computing device. As illustrated in this example, a GUI 200 of a computing device, which may be the GUI of a remote desktop or a local device, is covered substantially entirely by a watermark containing the text "CONFIDENTIAL". With this approach, the watermark appears over windows 202, 204, 206 of applications in the GUI 200 as well as everywhere else in the GUI 200. As a result, areas like the background and applications that may not contain sensitive content are nonetheless covered with a watermark, causing unnecessary detriment to user experience.

To improve such issues, the various embodiments described herein provide for systems and methods for selectively placing watermarks on application windows.

Figure 3:
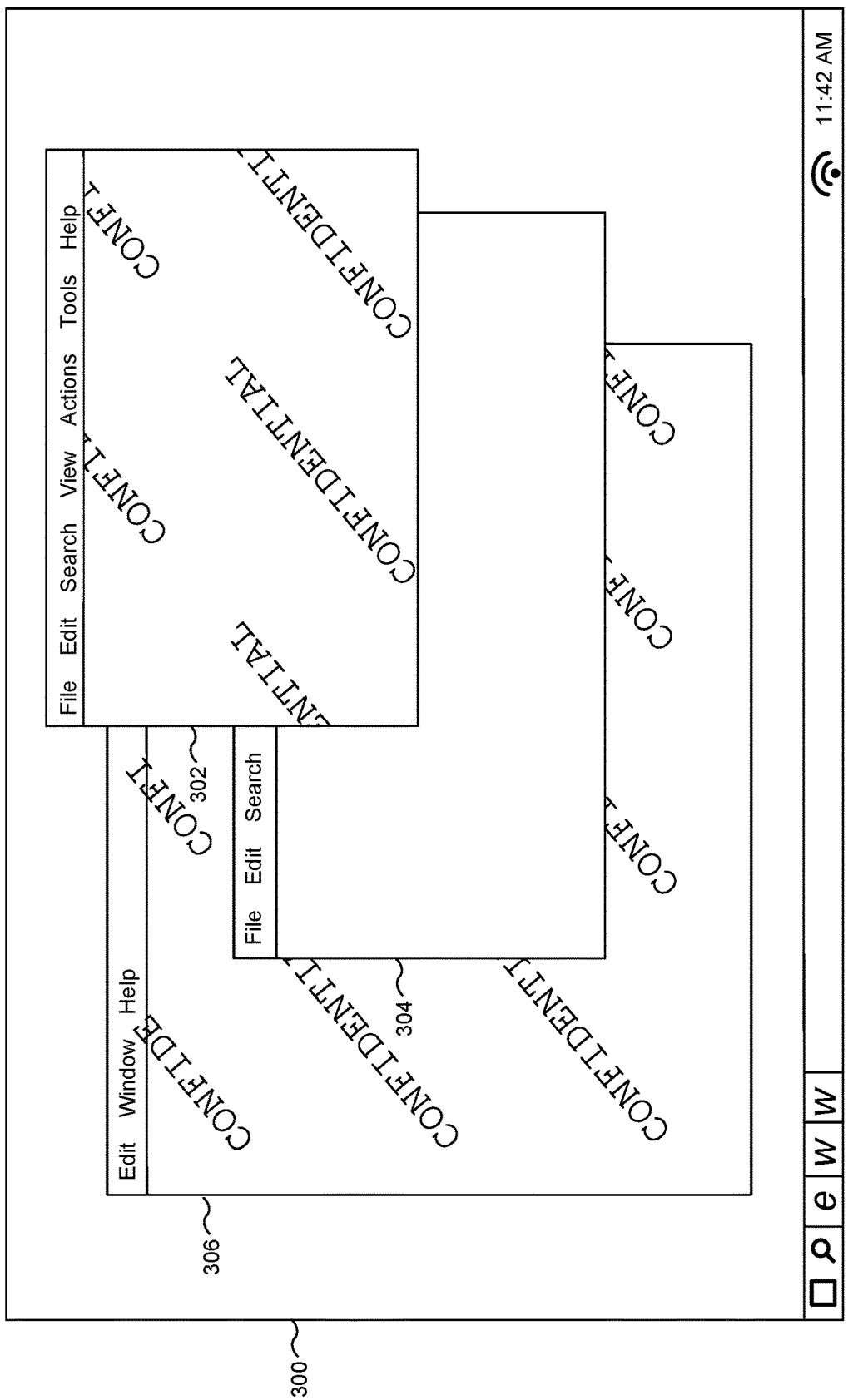
FIG. 3 illustrates a per-window visual watermark, in accordance with various embodiments.

FIG. 3 illustrates a per-window visual watermark, in accordance with various embodiments. As illustrated in this example, a GUI 300 of a computing device, which may be the GUI of a remote desktop or a local device, contains three application windows 302, 304, 306. The watermark "CONFIDENTIAL" is drawn over two of the windows 302, 306 and not over the third one 304. The watermark is also not drawn over the background of the GUI and the menu of the windows 302. As a result, the watermark is placed over selected or specific windows (e.g., as may be defined by administrators) and the user is not inundated with watermarks on other application windows (e.g., 304) and everywhere else in the GUI 300.

In various embodiments, the per-window visual watermark can be implemented using a window information tracker component and a watermark drawer component, each of which can be software modules. The window information tracker can obtain various information about application windows (e.g., 302, 304, 306) opened in the GUI 300 and convey the window information to the watermark drawer. The watermark drawer can calculate the uncovered watermark regions of each opened application window (e.g., 302, 304, 306) in which the watermark will be drawn and draw the watermark.

Figure 4:
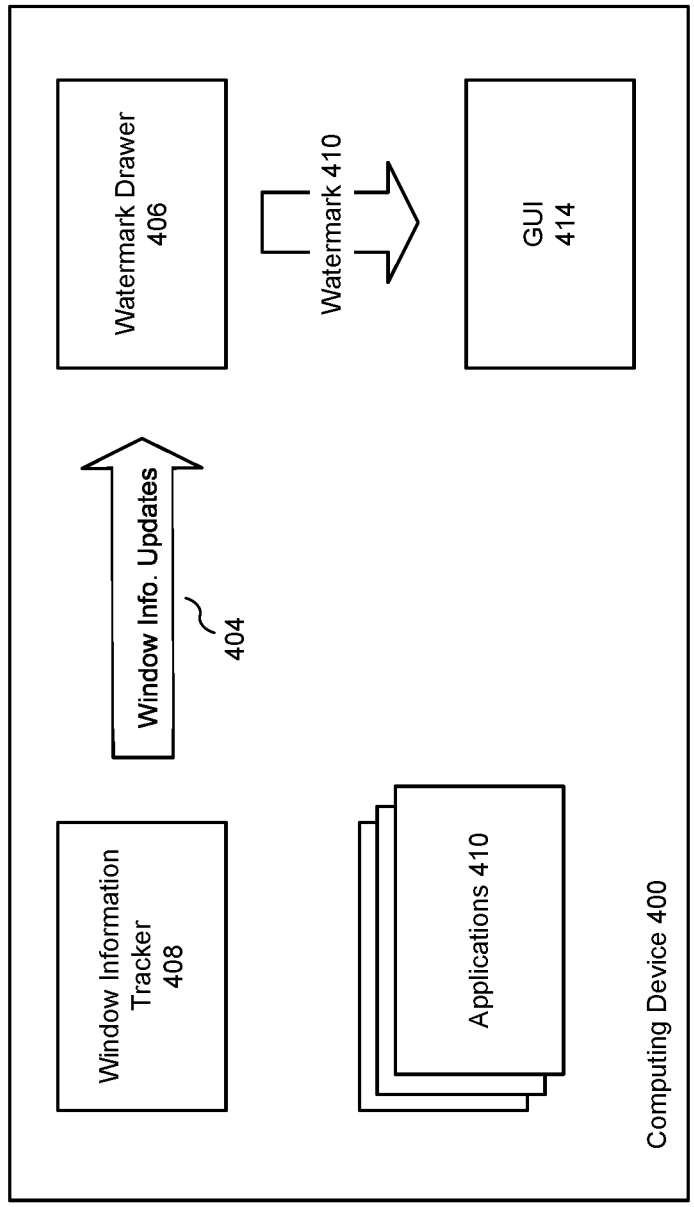
FIG. 4 illustrates an example architecture of per-window visual watermark implementation in a local desktop, in accordance with various embodiments.

FIG. 4 illustrates an example architecture of per-window visual watermark implementation in a local desktop, in accordance with various embodiments. As illustrated in the example of FIG. 4, a user 402 can access a local desktop running on a computing device 400, which can be any kind of device such as a desktop computer, laptop computer, smartphone, tablet, etc.

A window information tracker 408 can run on the computing device 400 and capture window information updates corresponding to windows of applications 410 that are opened in the desktop. The window information tracker 408 can capture the application window information when a window event is detected such as a window open, window move, window resize, window close, or window open operation (e.g., when a new application window is opened). Hence, the window information tracker 408 can capture updates to the application window information in response to a window being moved, resized, closed, or opened in the desktop (e.g., by the user 402). Here, moving the window can refer to changing the location of the window in the X and/or Y-dimension, as well as to changing the Z-order of the window. The Z-order of a window indicates the window's position in relation to other windows in the direction out of the GUI (e.g., to the position of the window above or below other windows). The windows in the GUI can be oriented along an imaginary axis extending outward from the GUI (the z-axis) to indicate which windows overlap or are overlapped by other windows. For example, a window at the top of the z-order overlaps all other windows and a window at the bottom of the Z-order is overlapped by all other windows. Hence, when the Z-order of a window changes, e.g., when a user changes focus from one window to another window to make it the active window and bring it to the top of the Z-order, the window information tracker 408 can obtain an update to the window information to reflect the change.

At least some of the obtained window information can be provided by or obtained from the operating system of the computing device 400. For example, the window information tracker 408 can use the API (application programming interface) of the client device's 400 operating system (OS) to obtain and track the application window information for any windows in the desktop. In various embodiments, the window information tracker 408 can receive a callback from the OS when there is a window operation such as a window move, resize, open, or close, and the window information tracker 408 can obtain corresponding updated application window information following the window operation.

The window information captured by the window information tracker 408 can contain various data about application windows opened in the desktop that can be used in subsequent steps to determine uncovered watermark regions in which the watermark is drawn. The information can include various data such as window position in the GUI, window shape, window size, window z-order, and window type. Window position can refer to the X and Y coordinates of the window in the GUI. Window shape can refer to the shape of the window, which is commonly a rectangle but can also be other shapes such as a circle, oval, etc. Window size can refer to the size of the window, for example the height and width of a rectangular window. Z-order can refer to the position of a window in relation to other windows in the Z-dimension, as discussed above. Window type can refer to various information relating to the type of the window, such as information identifying the application (e.g., 410) producing the window or information relating to the content, configuration, or layout of the window. In various embodiments, the window type information can be used to determine what portions of the window are to be covered by a watermark (in cases where the watermark is not placed over the entire window). For example, a watermark is generally not desirable over portions of an application window that do not contain content (e.g., where portions of a document or other content viewed in the application window are not displayed) such as menus, frames, buttons, etc. On the other hand, a watermark is generally desirable over portions of a window where content such as documents appears. Accordingly, the window type information can be used to determine what portions of a window will be covered by a watermark based on rules or logic indicating what portions of a window are designated for a watermark.

After capturing the window information, the window information tracker 408 can convey the window information updates 404 to a watermark drawer 406, which can also execute in the computing device 400. Based on the window information updates 404, the watermark drawer 406 can determine uncovered watermark regions for the application windows opened in the desktop where the watermark will be drawn.

In various embodiments, the watermark drawer 406 can utilize a process that goes through each open application window to determine a uncovered watermark region for the window, if any. For example, the process can iterate each window starting from the top window (top of the Z-order) and proceed to the bottom window (bottom of the Z-order). For example, referring to FIG. 3, the process can iterate windows 302, 304, and 306 in that order.

For each application window, the process can first determine if the window is entitled to receive a watermark. For example, the process can check if the application 410 corresponding to the application window is designated for receiving a watermark. In an embodiment, the watermark drawer 406 can check in a predefined list (which may be produced by an administrator) that specifies which applications require a watermark, or specifies which applications do not require a watermark, to determine if the application 410 is indicated for receiving a watermark. If the application 410 is indicated for requiring a watermark, then the process can proceed to determining the uncovered watermark region for the application window. If, on the other hand, the application 410 is not indicated for receiving a watermark, then the process can proceed to the next window (e.g., the next window in the Z-order). In some embodiments, every application window can be entitled to receive a watermark, in which case the step of determining if the window is entitled to receive a watermark can be omitted and the process can proceed to determining the uncovered watermark region for the application window.

After determining that an application window is entitled to a watermark, the process can determine a designated watermark region for the application window. The designated watermark region can define a region in the application window that is designated to receive a watermark. For example, in some cases or embodiments, the entire application window can be designated to receive a watermark, in which case the designated watermark region can be defined as the entire region of the application window (including any menus, etc.).

In other cases or embodiments, the designated watermark region can be a region within the application window covering some portion of the application window. Generally, the designated region for a window can be defined so that the watermark appears over content presented in the application window such as documents and not over other areas, such as areas of menus, frames, etc. that may not be desired for watermarking. For example, the designated watermark region can be defined as an area where certain content in the application window, such as documents, is presented. In various embodiments, the designated watermark region can be defined as the region of the window excluding certain portions where a watermark is not desirable, such as areas of menus, frames, etc.

The process can obtain information for determining the designated watermark region for an application window in various ways. In an embodiment, the process can obtain information regarding the location of regions within the application window that are to be watermarked (e.g., regions of the window where content such as documents is presented) and/or information regarding the regions within the application window that are not to be watermarked (for example, menus, buttons, frames, etc.) from the OS of the computing device 400, from the application itself 410, or from other sources. For example, such information may be obtained from the window type that is obtained by the window information tracker 408, as described above. In another embodiment, a rule library (which can be defined by administrations) can be utilized that indicates how the designated watermark region for a window of an application is to be calculated. The rule library can take into account window type information and other information about the application 410 and/or application window. For example, such a rule library can indicate that certain portions of an application window region are to be excluded from the designated watermark region for a certain application.

For example, referring back to FIG. 3, for window 306, the designated watermark region can be defined as the entire region of the application window 306, resulting in the watermark appearing over the entire region of the window 306 including the menu bar, as illustrated. For window 302, on the other hand, the designated watermark region can be defined as the region of the application window 302 but omitting the region of the menu bar, resulting in the watermark appearing over the region of the window 302 but not over the menu bar, as illustrated.

After determining the designated watermark region for an application window, the process can determine the uncovered watermark region. The uncovered watermark region can be a region of the designated watermark region that is not covered or occluded by other windows in the GUI. For example, the process can determine what windows are above the given application window in the Z-order, and then the process can determine what portion or portions of the designated watermark region is/are not covered by the above windows. Those exposed portions of the designated watermark region can then be defined as the uncovered watermark region where the watermark will be drawn. Hence, if a designated watermark region is not occluded by any other windows, then the uncovered watermark region can be defined as the entire region of the designated watermark region.

For example, after the windows above the application window (the "above application windows") are identified, the regions of the above application windows can be combined to produce an above region. E.g., the above region can be a union of the window regions of all the windows above the application window. The uncovered watermark region can then be defined as the region of the designated watermark region that does not intersect the above region. For example, the uncovered watermark region can be calculated by subtracting the above region from the designated watermark region. In a similar way, uncovered watermark regions can be calculated for other application windows in the desktop.

In various embodiments, when a window operation takes place (e.g., is detected) in the desktop (e.g., when an application window is moved, resized, opened, or closed), the uncovered watermark regions in the GUI can be recalculated in response to the detected window operation. For example, when a window operation is detected, the window information tracker 408 can obtain window information updates 404 corresponding to the window operation. For example, the window information tracker 408 can receive a callback from the OS notifying it of the window event and the window information tracker 408 can obtain window information updates corresponding the window event from the OS. The window information tracker 408 can forward the window information updates 404 to the watermark drawer 406, which can then recalculate the uncovered watermark regions for the application windows based on the window information updates 404 so that the watermark can be updated. In various embodiments, the process for determining the uncovered watermark regions for each of the windows in the GUI can be performed (e.g., the iterations can be performed for each window) whenever a window event takes place on a window in the GUI. Due to window overlap, changes in a window can affect the uncovered watermark region not just in that window but in other windows in the GUI, hence necessitating that uncovered watermark regions in all affected windows are recalculated when a window operation takes place in the GUI.

It should also be noted that changes in windows that do not contain a watermark can affect the uncovered watermark regions in windows that do contain a watermark (e.g., due to overlap). Hence, in various embodiments, the recalculation of window uncovered watermark regions can be triggered when there is a window event in applications that are not indicated for a watermark as well as when there is a window event in application windows that are indicated for a watermark.

After each uncovered watermark region for the applications opened in the desktop is determined, the watermark drawer 406 can retrieve a watermark (e.g., a watermark graphic and/or text) and draw the watermark 410 in the uncovered watermark regions over the application windows in the GUI 414. In an embodiment, the process can determine the uncovered watermark regions for all application windows and then draw the watermark in the uncovered watermark regions. In another embodiment, the watermark can be draw over each application window after the corresponding uncovered watermark region for the application window is calculated before the process moves on to calculating a uncovered watermark region for the next window.

As will be appreciated by those skilled in the art, the watermark can contain various generic information, such as notices (e.g., confidentiality notices), company logos, and so on and/or information about the user and the session. For example, the watermark may contain the user's login name, user ID, session ID, the client IP address, the connection time, and the like, as mentioned above. The watermark can be semi-transparent to allow readers to digest content behind the watermark or it can be invisible to the human eye as described previously, and the watermark can be repeated in a pattern across the region where the watermark is applied, in this case the uncovered watermark region.

In various embodiments, the watermark can be drawn in the uncovered watermark region of each of the application windows in an "overlay" placed over the one or more application windows in the GUI, meaning that the watermark may not drawn by the application itself but instead can be drawn or applied over the application window after the application window is produced by the application. For example, the overlay may be a window that is set above the one or more application windows, and the watermark can be drawn in the overlayed window in the uncovered watermark regions while leaving other areas of the overlayed window transparent. The overlayed window can be configured to not receive mouse and keyboard inputs to allow the user to interact with the application window below the overlayed window. In various embodiments, the watermark drawer 406 can create the window. Such a window overlay may utilize a single window, which can cover the entire GUI, to draw the watermark over all uncovered watermark regions of application windows. In other embodiments, multiple overlay windows can be used (e.g., a dedicated overlay window can be used for each application window to draw the watermark in the uncovered watermark region over the application window), although this approach may be less efficient.

Different approaches can likewise be utilized to apply an overlay placing the watermark over the uncovered watermark regions of the application windows in the GUI and the invention is not limited to any particular approach. For example, the overlay may be a bitmap the size of the entire GUI in which the watermark can be drawn in the uncovered watermark regions of each application window. In various embodiments, the overlay can be drawn over the GUI directly in the display card of the computing device 400. The overlay can be applied over the GUI produced by the desktop before it is pushed to the display. For example, the process can intercept the GUI framebuffer or the GUI images and apply the overlay on top of the framebuffer or image.

To illustrate the process of determining uncovered watermark regions, we can refer back to the example of FIG. 3. The process for determining the uncovered watermark regions for the application windows 302, 304, 306 can begin iterations at the top of the Z-order with window 302. The process can determine that the application corresponding to window 302 is designated for receiving a watermark (e.g., based on a list). The process can then determine the designated watermark region for the window 302, e.g., based on window type or rules. In this case, the designated watermark region for the window 302 can be defined as the entire area of the window 302 excluding the menu bar (as illustrated by the resulting watermark in the window 302). To determine the uncovered watermark region, the process can determine what portions of the designated watermark region are not occluded by other windows. The process can do this by identify any above windows and determining an above region. In this case, because window 302 is the top window, there are no above windows. Accordingly, the above region is empty. Hence, the process can define the uncovered watermark region to be the entire designated watermark region. The process can then proceed to the next window 304.

For window 304, the process can determine that the application corresponding to window 304 is not designated for receiving a watermark (e.g., based on a list). The process can then proceed to the next window 306 without calculating a uncovered watermark region, since window 304 will not receive a watermark.

For window 306, the process can determine that the application corresponding to window 306 is designated for receiving a watermark (e.g., based on a list). The process can then determine the designated watermark region for the window 306, e.g., based on window type or rules. In this case, the designated watermark region for the window 306 can be defined as the entire area of the window 306 (as illustrated by the resulting watermark in the window 306). To determine the uncovered watermark region, the process can determine what portions of the designated watermark region are not occluded by other windows. The process can do this by identify any above windows and determining an above region. In this case, windows 302 and 304 are the above windows. Accordingly, the above region can be defined as the combine region or union of the regions of windows 304 and 302. The process can then define the uncovered watermark region of window 306 to be the portion of the designated watermark region that is not occluded by, or that does not intersect with, the above region. For example, the uncovered watermark region can be calculated by subtracting the above region from the designated watermark region. Because the window 306 is the bottom window, the process can then stop.

In an embodiment, the watermark can be drawn in an overlay over each window 302, 306 in turn as the corresponding uncovered watermark region is calculated. In another embodiment, the uncovered watermark regions for all windows 302, 306 can be calculated first and the watermark can be drawn over both windows 302, 306 in an overlay together.

Subsequently, if a window operation is received for any of the windows 302, 304, 306 or for a new window, the process can be repeated anew for all the windows opened in the GUI 300 to update the watermark.

As mentioned previously, the invention may be implemented in a virtual desktop. In one approach, the watermark can be applied to the GUI in the virtual desktop on the server and the GUI containing the watermark can be conveyed to the client device. In another approach, the GUI can be conveyed to the client without the watermark and the client can overlay the watermark. While both approaches are feasible, the latter approach may be desirable for decreasing server-side workload and leveraging client-side processing, since the client is responsible for drawing and overlaying the watermark in the latter case. However, in some cases a client may not support drawing a watermark or it may not have the feature, in which case the first approach can be utilized. In some embodiments, the virtual desktop can be configured to utilize the first approach (client-side watermark placement) when a client capable of drawing a watermark is used, and to switch to the second approach in cases where it determines that the client is not capable of drawing the watermark over the GUI itself.

Figure 5:
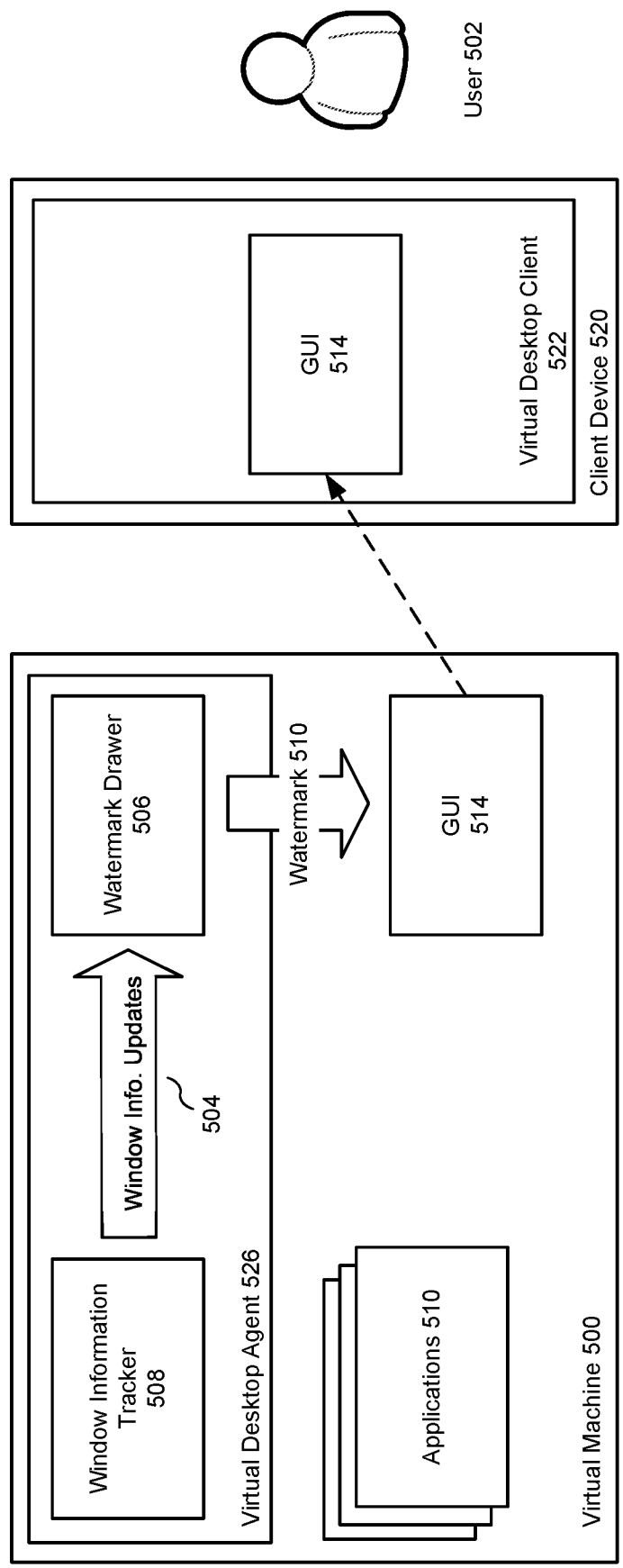
FIG. 5 illustrates an example architecture of per-window visual watermark implementation in a virtual desktop utilizing server-side watermark application, in accordance with various embodiments.

FIG. 5 illustrates an example architecture of per-window visual watermark implementation in a virtual desktop utilizing server-side watermark application, in accordance with various embodiments. As illustrated in the example of FIG. 5, a user 502 of a client device 520 can access a virtual desktop presented by a virtual machine 500 executing on a server in a datacenter (not illustrated) via a virtual desktop session enabled by a virtual desktop client 522 executing on the client device 520 that communicates with a virtual desktop agent 526 executing in the virtual machine 500 over a network connection (not pictured). The agent 526 can stream the virtual desktop GUI 514 to the client 522 and the client can convey user 502 inputs into the virtual desktop to the agent 526, to be effectuated in the desktop. The virtual desktop agent 526 as well as various applications 510 in the virtual desktop may be running in a guest OS (not pictured) in the VM 500. In various embodiments, the virtual desktop may be provided as part of VDI or other type of virtual desktop environment, such as DAAS or RDS.

As illustrated, the VM 500 can further contain a window information tracker 508 and a watermark drawer 506. In this example, the window information tracker 508 and the watermark drawer 506 are part of the agent 526 although in other embodiments these components can be located outside of the agent 526. The window information tracker 508 and the watermark drawer 506 can performed the functions described above for placing a watermark 510 over windows of applications 510 opened in the desktop. In various embodiments, the window information tracker 508 and the watermark drawer 506 can function as described above and in FIG. 4 in the context of local desktops. For example, the window information tracker 508 can obtain window information updates 504 for application windows in the desktop and convey the window information updates 504 to the watermark drawer 506. Based on the window information updates 504, the watermark drawer 506 can determine uncovered watermark regions for the application windows. The watermark drawer 506 can then place an overlay containing the drawn watermark 510 in the uncovered watermark region of each of the application windows over the one or more application windows in the GUI 514 in the virtual desktop before the GUI 514 is conveyed to the client 522. This way, the GUI 514 conveyed to and received at the client 522 can contain the watermark 510 drawn over the application windows.

As mentioned previously, in implementations utilizing virtual desktops, it may be preferable to place the watermark over application windows in the GUI on the client device instead of on the server as in the example of FIG. 5. A benefit if this approach can be in offloading work from the server to the client. In this case, the GUI can be conveyed to the client without the watermark and the client can overlay the watermark.

For example, the GUI can be streamed from the virtual desktop to the client before a watermark is drawn. The client can receive the GUI, place an overlay over application windows in the received GUI, and draw the watermark in the uncovered watermark region of each of the application windows in the overlay.

Figure 6:
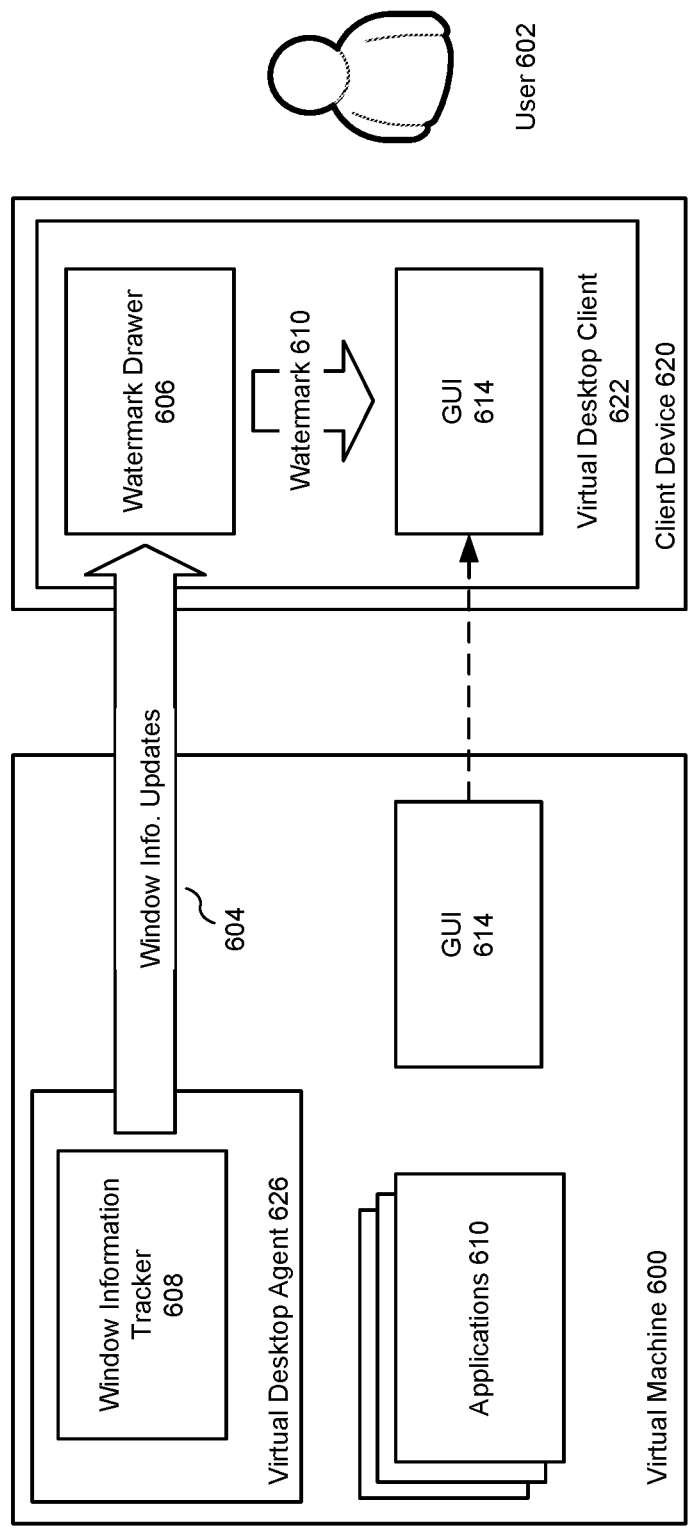
FIG. 6 illustrates an example architecture of per-window visual watermark implementation in a virtual desktop utilizing client-side watermark application, in accordance with various embodiments.

FIG. 6 illustrates an example architecture of per-window visual watermark implementation in a virtual desktop utilizing client-side watermark application, in accordance with various embodiments. As illustrated in the example of FIG. 6, a user 602 of a client device 620 can access a virtual desktop presented by a virtual machine 600 executing on a server in a datacenter (not illustrated) via a virtual desktop session enabled by a virtual desktop client 622 executing on the client device 620 that communicates with a virtual desktop agent 626 executing in the virtual machine 600 over a network connection (not pictured). The agent 626 can stream the virtual desktop GUI 614 to the client 622 and the client can convey user 602 inputs into the virtual desktop to the agent 626, to be effectuated in the desktop. The virtual desktop agent 626 as well as various applications 610 in the virtual desktop may be running in a guest OS (not pictured) in the VM 600. In various embodiments, the virtual desktop may be provided as part of VDI or other type of virtual desktop environment, such as DAAS or RDS.

As illustrated, the VM 600 can further contain a window information tracker 608. In this example, the window information tracker 608 is part of the agent 626 although in other embodiments this component can be located outside of the agent 626. The watermark drawer 606 can now be located on the client device 620 to draw the watermark over the GUI 614 that is received from the remote virtual desktop. In this example, the watermark drawer 606 is part of the virtual desktop client 622 although in other embodiments this component can be located outside of the client 622 on the client device 620. As applicable, the window information tracker 608 and the watermark drawer 606 can performed the functions described above for placing a watermark 610 over windows of applications 610 opened in the desktop. In various embodiments, the window information tracker 608 and the watermark drawer 606 can function as described above and in FIGS. 4 and 5. For example, the window information tracker 608 can obtain window information updates 604 for application windows in the desktop and convey the window information updates 604 to the watermark drawer 606. However, in this case, because the watermark drawer 606 is located on the remote client device 620, the window information updates 604 can be conveyed over a network connection to the watermark drawer 606 on the client device 620.

Based on the window information updates 604, the watermark drawer 606 can determine uncovered watermark regions for the application windows. The watermark drawer 606 can then place an overlay containing the drawn watermark 610 in the uncovered watermark region of each of the application windows over the one or more application windows in the GUI 614 that is received at the client 622 from the virtual desktop.

Hence, in the example of FIG. 6, the GUI 614 that is conveyed to the client 620 from the VM 600 does not contain a watermark and the watermark drawer 606 can apply the watermark 610 over the application windows in the received GUI 614 on the client device 620. Different approaches were described above for applying an overlay with a watermark in uncovered watermark regions of application windows in a GUI and such approaches can be utilized, as applicable, for placing the watermark 610 over the GUI 614 in embodiments utilizing client-side watermark application such as the example of FIG. 6. For example, the GUI 614 can be received at the client 622 from the virtual desktop as a series of frames or images (e.g., GUI framebuffers can be received from the virtual desktop). In various embodiments, the watermark drawer 606 can apply the watermark 610 by placing an overlay containing the watermark 610 over the frames or images of the GUI 614 that are received from the remote virtual desktop.

Aside from the window information updates 604, in various embodiments, other information can also be conveyed to the client 622 from the virtual desktop (e.g., by the agent 608). For example, the watermark itself (i.e., the text and/or graphics of the watermark) may be conveyed to the watermark drawer 606 from the virtual desktop (e.g., over a network connection) to provide the watermark to the watermark drawer 606 when the watermark is not available on the client device 620. Also, additional information that may be needed by the watermark drawer 606 for determining the uncovered watermark regions of application windows based on the window information updates 604 may be sent to the client 622 from the virtual desktop. Such information may be identification of which application windows, or which applications, are required to have a watermark, or corresponding lists that identify applications requiring watermarks.

In various embodiments, some of the steps described in FIG. 6 as taking place on the client 620 can be performed on the server side, and vice versa. In some embodiments, all or any of the steps for determining uncovered watermark regions for application windows can be performed on the virtual desktop instead of on the client device 620. For example, the uncovered watermark regions can be calculated in the virtual machine 600 (e.g., by the agent 626) and the uncovered watermark regions can then be sent to the watermark drawer 606 on the client 620 to apply the watermark 610. In this case, it may be unnecessary to send the window information updates 604.

Figure 7:
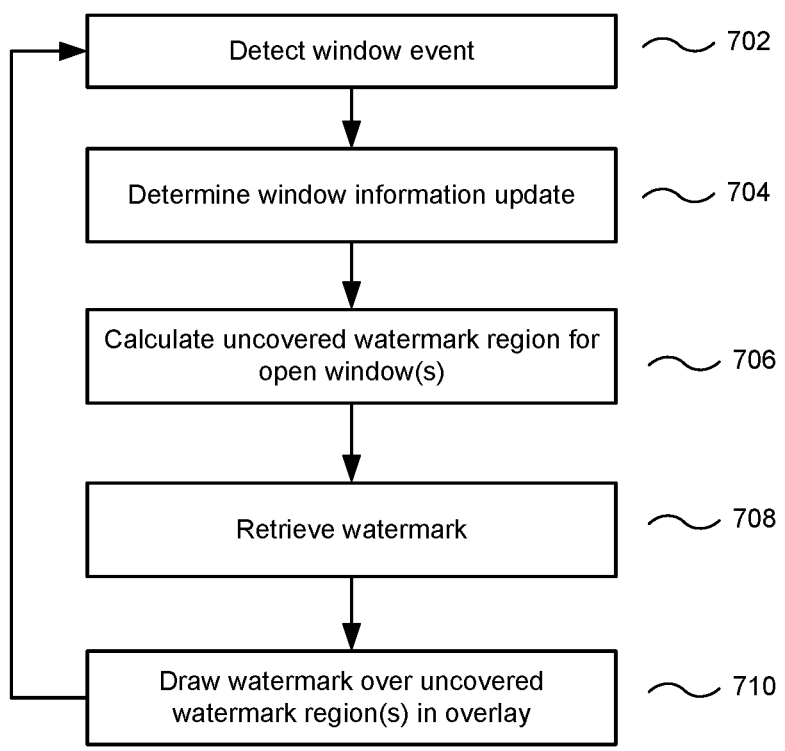
FIG. 7 illustrates an example process flow for per-window visual watermark implementation, in accordance with various embodiments.

FIG. 7 illustrates an example process flow for per-window visual watermark implementation, in accordance with various embodiments. The process described in the example of FIG. 7 can be implemented in either local desktops or virtual desktops (with either server-side or client-side watermark application).

The process can begin in operation 702, where a window event is detected, such as a window move, resize, close or open event. In operation 704, a window information update can be determined corresponding to the window event. For example, the window information update can be obtained from the operating system. In operation 706, a uncovered watermark region can be calculated for open windows in the desktop. For example, the process can determine which windows require a watermark (based on a list) and then determine uncovered watermark regions for the window(s) that require watermarks based on window information.

After the uncovered watermark regions are calculated, in step 708, the process can retrieve a watermark. The watermark can contain text or graphics. In operation 710, the process can draw the watermark over the calculated uncovered watermark regions in an overlay placed over the application windows. The process can then return to operation 702, where a subsequent window event is detected.

Figure 8:
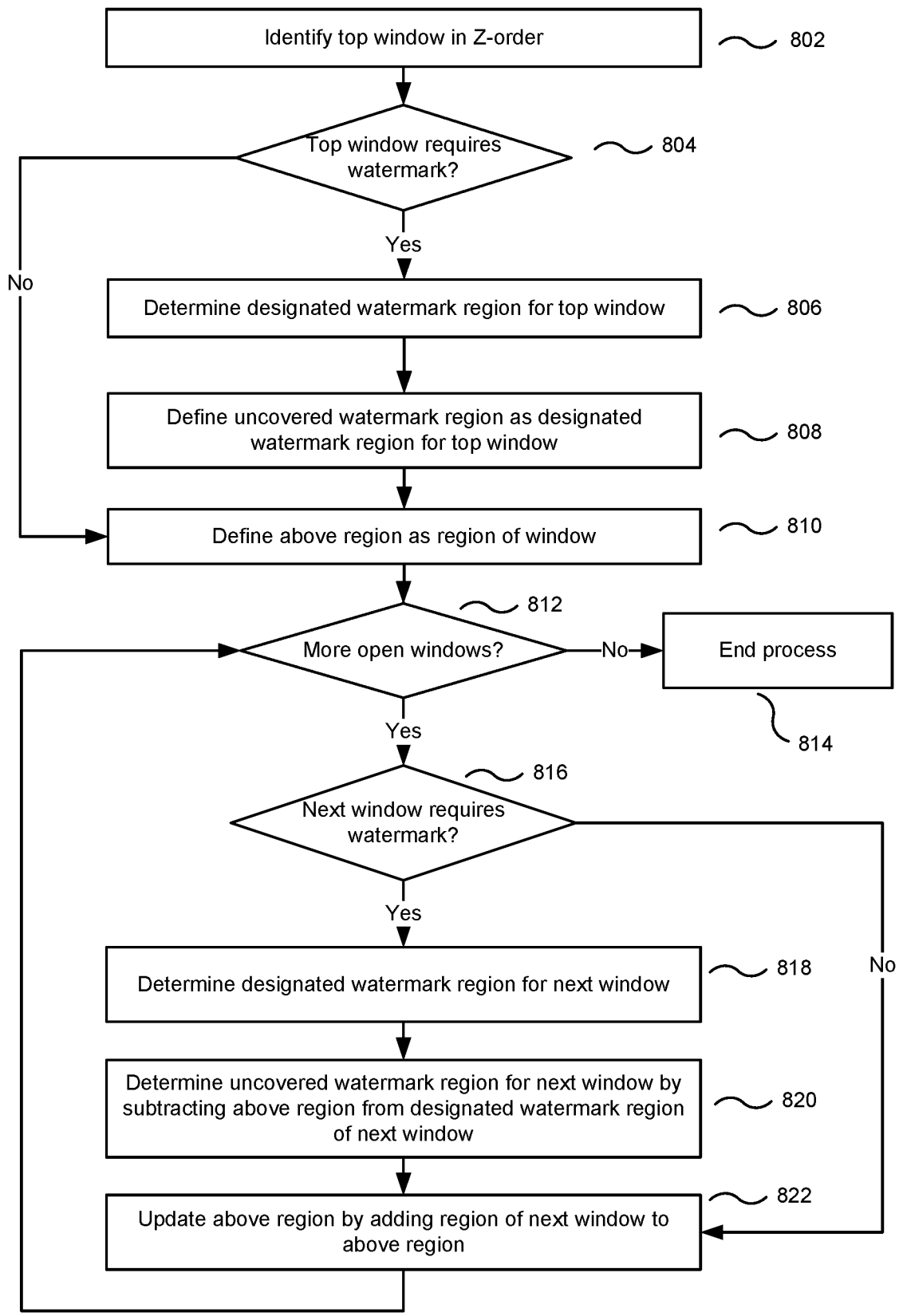
FIG. 8 illustrates an example process flow for calculating uncovered watermark regions for application windows, in accordance with various embodiments.

FIG. 8 illustrates an example process flow for calculating uncovered watermark regions for application windows, in accordance with various embodiments. For example, the system can implement such a process to calculate uncovered watermark regions for application windows when a window event, such as a move, resize, open, or close occurs. In this example process, the windows are iterated from the top of the Z-order to the bottom to determine a uncovered watermark region (if any) for each open window in the desktop.

The process can begin in operation 802, where a top window in the Z-order is identified. In operation 804, the process can determine if the top window requires a watermark, e.g., by checking in a predefined list. If the process determines that a watermark is required, then the process proceeds to operation 806, where it can determine a designated watermark region for the top window. In operation 808, the process can define the uncovered watermark region as the designated watermark region for the top window. Because the top window is not occluded by other windows, the above region in this step is empty. Nothing will occlude the top window; therefore, the uncovered watermark region can be defined as the designated watermark region. The process can then proceed to operation 810, where it can define the above region as the region of the top window. If, in operation 804 the watermark is not required for the top window, then there will not be a uncovered watermark region for the top window and the process can proceed directly to operation 810, where it can define the above region as the region of the top window.

The process can then proceed to decision 812, where it can determine if there are further open windows in the desktop (i.e., below the top window). If there are no further windows, then the process can end in operation 814 as all the uncovered watermark regions have been determined.

If the proceed determines that there are more open windows in the desktop in operation 812, then the process can proceed to decision 816, where it can determine if the next window requires a watermark, e.g., by checking in a predefined list. If the process determines that a watermark is required, then the process can proceed to operation 818, where it determines a designated watermark region for the next window. In operation 820, the process can determine the uncovered watermark region for the next window by subtracting the above region from the designated watermark region of the next window. Namely, in this step the process can determine what portion of the designated watermark region is not covered by the above region and that portion is defined as the uncovered watermark region.

The process can then proceed to operation 822, where it can update the above region by adding the region of the next window to the current above region. Namely, the above region is updated by combining it with the region of the next window. If, in operation 816 the watermark is not required for the next window, then there will not be a uncovered watermark region for the next window and the process can proceed directly to operation 822, where it can update the above region by adding the region of the next window to the current above region. The process can then return to decision 812, where it can determine if there are further open windows in the desktop. If there are no further windows, then the process can end in operation 814 as all the uncovered watermark regions have been determined.

This way, the process can iterate every window open in the desktop to determine a uncovered watermark region for the window, if any. In some embodiments, the system can draw the watermark over the application windows as the uncovered watermark regions are determined (e.g., after steps 808 and 820). In other embodiments, the system can wait for the process to end (e.g., in operation 814), when all the uncovered watermark regions are determined and draw the watermark over all the application windows then in corresponding uncovered watermark regions.

Figure 9:
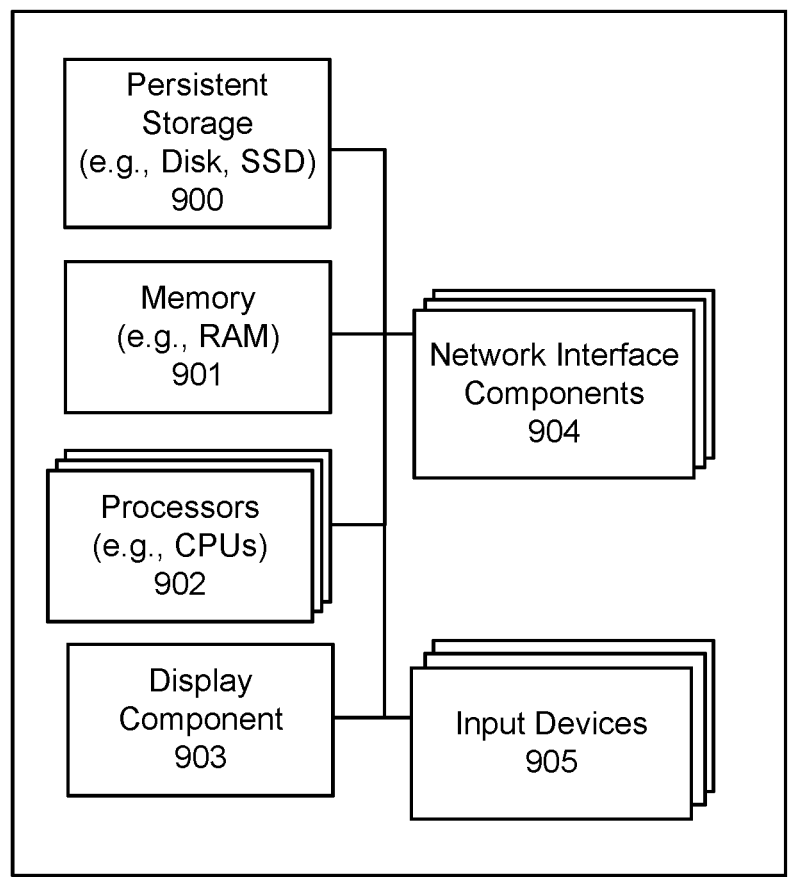
FIG. 9 illustrates an example of some general components of a computing device, in accordance with various embodiments.

FIG. 9 illustrates an example of some general components of a computing device, in accordance with various embodiments. In this particular example, the device includes one or more processors (e.g., central processing units (CPUs) 902 for executing instructions that can be stored in a storage medium component. The storage medium can include many types of memory, persistent data storage, or non-transitory computer-readable storage media. For example, the storage medium may take the form of random access memory (RAM) 901 storing program instructions for execution by the processor(s) 902, a persistent storage (e.g., disk or SSD) 900, a removable memory for sharing information with other devices and/or the like. The computing device typically can further comprise a display component 903, such as a monitor, a touch screen, liquid crystal display (LCD), or the like. In various embodiments, the computing device will include at least one input device 905 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 804 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for placing an overlay containing a watermark over a virtual desktop graphical user interface (GUI) containing a plurality of application windows corresponding to one or more applications running in the virtual desktop on a remote server, the overlay placing the watermark over two or more application windows in the plurality of application windows that are designated to receive the watermark, comprising:

establishing a virtual desktop session on the virtual desktop by a virtual desktop client running on a client device that communicates with a virtual desktop agent running in the virtual desktop, wherein the virtual desktop is presented by a guest operating system running in a virtual machine on the remote server and the one or more applications are executing on the guest operating system, the virtual desktop client being configured to receive user inputs into the virtual desktop on the client device and to convey the received user inputs to the virtual desktop agent to be effectuated in the virtual desktop, and wherein the virtual desktop client is further configured to present the GUI of the virtual desktop that is streamed to the virtual desktop client to the user on the client device;

by the virtual desktop agent running in the virtual desktop, obtaining window information comprising a position in the GUI and a Z-order of each of the plurality of application windows in the virtual desktop and conveying the window information to the virtual desktop client on the client device;

by the virtual desktop agent running in the virtual desktop, sending to the virtual desktop client on the client device information identifying the two or more application windows in the plurality of application windows that are designated to receive the watermark;

by the virtual desktop client on the client device:
receiving the window information for the plurality of application windows and the information identifying the two or more application windows in the plurality of application windows that are designated to receive the watermark conveyed from the virtual desktop agent;

for each of the two or more application windows designated to receive the watermark, determining by the virtual desktop client an uncovered watermark region in the application window based on the received window information comprising the position in the GUI and the Z-order of each of the plurality of application windows by:
determining a designated watermark region corresponding to a region of the application window designated to receive the watermark; and
defining the uncovered watermark region to be a region of the designated watermark region that is not occluded by other windows in the GUI;

receiving the GUI from the virtual desktop agent;
retrieving the watermark; and
drawing by the virtual desktop client the watermark in the determined uncovered watermark region of each of the two or more application windows designated to receive the watermark in the overlay and placing the overlay on the received GUI.

2. The method of claim 1, wherein the determining the uncovered watermark region in the application window for each of the application windows designated to receive the watermark further comprises:
  determining an above region for the application window by:
    identifying one or more application windows located above the application window in the GUI;
    for each of the one or more above application windows, determining a corresponding window region corresponding to a region covered by the above application window;
    combining the determined window regions of the above application windows to produce the above region; and
  defining the uncovered watermark region to be a region of the designated watermark region that does not intersect the above region.

3. The method of claim 1, further comprising:
  by the virtual desktop client:
    receiving updated window information from the virtual desktop agent; and
    recalculating the uncovered watermark regions for the two or more application windows designated to receive the watermark based on the updated window information.

4. The method of claim 3, wherein the virtual desktop agent conveys the updated window information to the virtual desktop client in response to detecting an application window move, resize, close or open operation in the virtual desktop.

5. The method of claim 1, further comprising determining to place the watermark over the two or more application windows designated to receive the watermark in response to determining that a corresponding application for each of the application windows is indicated in a predefined list, the predefined list specifying applications that require a watermark.

6. The method of claim 1, wherein the overlay is a window that does not receive mouse and keyboard inputs, which is placed over the received GUI by the virtual desktop client, wherein the overlay covers the entire GUI and is transparent in regions other than the regions containing the watermark.

7. The method of claim 1, wherein the determining the uncovered watermark region in the two or more application windows designated to receive the watermark by the virtual desktop client for at least one of the application windows designated to receive the watermark further comprises:
  determining an above region for the application window by:
    identifying a plurality of application windows located above the application window in the GUI;
    for each of the plurality of above application windows, determining a corresponding window region corresponding to a region covered by the above application window;
    combining the determined window regions of the above application windows to produce the above region; and
  defining the uncovered watermark region to be a region of the designated watermark region that does not intersect the above region.

8. A computing system comprising a client device and a remote server for placing an overlay containing a watermark over a virtual desktop graphical user interface (GUI) containing a plurality of application windows corresponding to one or more applications running in the virtual desktop on the remote server, the overlay placing the watermark over two or more application windows in the plurality of application windows that are designated to receive the watermark, comprising:
  at least one processor in the computing system; and
  memory including instructions that, when executed by the at least one processor, cause the computing system to perform the steps of:
    establishing a virtual desktop session on the virtual desktop by a virtual desktop client running on the client device that communicates with a virtual desktop agent running in the virtual desktop, wherein the virtual desktop is presented by a guest operating system running in a virtual machine on the remote server and the one or more applications are executing on the guest operating system, the virtual desktop client being configured to receive user inputs into the virtual desktop on the client device and to convey the received user inputs to the virtual desktop agent to be effectuated in the virtual desktop, and wherein the virtual desktop client is further configured to present the GUI of the virtual desktop that is streamed to the virtual desktop client to the user on the client device;
    by the virtual desktop agent running in the virtual desktop, obtaining window information comprising a position in the GUI and a Z-order of each of the plurality of application windows in the virtual desktop and conveying the window information to the virtual desktop client on the client device;
    by the virtual desktop agent running in the virtual desktop, sending to the virtual desktop client on the client device information identifying the two or more application windows in the plurality of application windows that are designated to receive the watermark;
    by the virtual desktop client on the client device:
      receiving the window information for the plurality of application windows and the information identifying the two or more application windows in the plurality of application windows that are designated to receive the watermark conveyed from the virtual desktop agent;
      for each of the two or more application windows designated to receive the watermark, determining by the virtual desktop client an uncovered watermark region in the application window based on the received window information comprising the position in the GUI and the Z-order of each of the plurality of application windows by:
        determining a designated watermark region corresponding to a region of the application window designated to receive the watermark; and
        defining the uncovered watermark region to be a region of the designated watermark region that is not occluded by other windows in the GUI;
      receiving the GUI from the virtual desktop agent;
      retrieving the watermark; and
      drawing by the virtual desktop client the watermark in the determined uncovered watermark region of each of the two or more application windows designated to receive the watermark in the overlay and placing the overlay on the received GUI.

9. The computing system of claim 8, wherein the determining the uncovered watermark region in the application window for each of the application windows designated to receive the watermark further comprises:
   determining an above region for the application window by:
      identifying one or more application windows located above the application window in the GUI;
      for each of the one or more above application windows, determining a corresponding window region corresponding to a region covered by the above application window;
      combining the determined window regions of the above application windows to produce the above region; and
   defining the uncovered watermark region to be a region of the designated watermark region that does not intersect the above region.

10. The computing system of claim 8, wherein the memory further includes instructions that when executed by the at least one processor, cause the computing device to perform the steps of:
   by the virtual desktop client:
      receiving updated window information from the virtual desktop agent; and
      recalculating the uncovered watermark regions for the two or more application windows designated to receive the watermark based on the updated window information.

11. The computing system of claim 10, wherein the virtual desktop agent conveys the updated window information to the virtual desktop client in response to detecting an application window move, resize, close or open operation in the virtual desktop.

12. The computing system of claim 8, wherein the memory further includes instructions that when executed by the at least one processor, cause the computing device to perform the steps of:
   determining to place the watermark over the two or more application windows designated to receive the watermark in response to determining that a corresponding application for each of the application windows is indicated in a predefined list, the predefined list specifying applications that require a watermark.

13. The computing system of claim 8, wherein the overlay is a window that does not receive mouse and keyboard inputs, which is placed over the received GUI by the virtual desktop client, wherein the overlay covers the entire GUI and is transparent in regions other than the regions containing the watermark.

14. The computing system of claim 8, wherein the determining the uncovered watermark region in the two or more application windows designated to receive the watermark by the virtual desktop client for at least one of the application windows designated to receive the watermark further comprises:
   determining an above region for the application window by:
      identifying a plurality of application windows located above the application window in the GUI;
      for each of the plurality of above application windows, determining a corresponding window region corresponding to a region covered by the above application window;
      combining the determined window regions of the above application windows to produce the above region; and
   defining the uncovered watermark region to be a region of the designated watermark region that does not intersect the above region.

15. A non-transitory computer readable storage medium in a computing system comprising a remote server in communication with a client device for placing an overlay containing a watermark over a virtual desktop graphical user interface (GUI) containing a plurality of application windows corresponding to one or more applications running in the virtual desktop on the remote server, the overlay placing the watermark over two or more application windows in the plurality of application windows that are designated to receive the watermark, comprising one or more sequences of instructions, the instructions when executed by one or more processors in the computing system causing the one or more processors to execute the operations of:
   establishing a virtual desktop session on the virtual desktop by a virtual desktop client running on a client device that communicates with a virtual desktop agent running in the virtual desktop, wherein the virtual desktop is presented by a guest operating system running in a virtual machine on the remote server and one or more applications are executing on the guest operating system, the virtual desktop client being configured to receive user inputs into the virtual desktop on the client device and to convey the received user inputs to the virtual desktop agent to be effectuated in the virtual desktop, and wherein the virtual desktop client is further configured to present the GUI of the virtual desktop that is streamed to the virtual desktop client to the user on the client device;
   by the virtual desktop agent running in the virtual desktop, obtaining window information comprising a position in the GUI and a Z-order of each of the plurality of application windows in the virtual desktop and conveying the window information to the virtual desktop client on the client device;
   by the virtual desktop agent running in the virtual desktop, sending to the virtual desktop client on the client device information identifying the two or more application windows in the plurality of application windows that are designated to receive the watermark;
   by the virtual desktop client on the client device:
      receiving the window information for the plurality of application windows and the information identifying the two or more application windows in the plurality of application windows that are designated to receive the watermark conveyed from the virtual desktop agent;
      for each of the two or more application windows designated to receive the watermark, determining by the virtual desktop client an uncovered watermark region in the application window based on the received window information comprising the position in the GUI and the Z-order of each of the plurality of application windows by:
         determining a designated watermark region corresponding to a region of the application window designated to receive the watermark; and
         defining the uncovered watermark region to be a region of the designated watermark region that is not occluded by other windows in the GUI;
      receiving the GUI from the virtual desktop agent;
      retrieving the watermark; and
      drawing by the virtual desktop client the watermark in the determined uncovered watermark region of each of the two or more application windows designated to receive the watermark in the overlay and placing the overlay on the received GUI.

16. The non-transitory computer readable storage medium of claim 15, wherein the determining the uncovered watermark region in the application window for each of the application windows designated to receive the watermark further comprises:
   determining an above region for the application window by:
      identifying one or more application windows located above the application window in the GUI;
      for each of the one or more above application windows, determining a corresponding window region corresponding to a region covered by the above application window;
      combining the determined window regions of the above application windows to produce the above region; and
   defining the uncovered watermark region to be a region of the designated watermark region that does not intersect the above region.

17. The non-transitory computer readable storage medium of claim 15, further comprising instructions that when executed by the one or more processors cause the one or more processors to execute the operations of:
   by the virtual desktop client:
      receiving updated window information from the virtual desktop agent; and
      recalculating the uncovered watermark regions for the two or more application windows designated to receive the watermark based on the updated window information.

18. The non-transitory computer readable storage medium of claim 17, wherein the virtual desktop agent conveys the updated window information to the virtual desktop client in response to detecting an application window move, resize, close or open operation in the virtual desktop.

19. The non-transitory computer readable storage medium of claim 15, further comprising instructions that when executed by the one or more processors cause the one or more processors to execute the operations of:
   determining to place the watermark over the two or more application windows designated to receive the watermark in response to determining that a corresponding application for each of the application windows is indicated in a predefined list, the predefined list specifying applications that require a watermark.

20. The non-transitory computer readable storage medium of claim 15, wherein the determining the uncovered watermark region in the two or more application windows designated to receive the watermark by the virtual desktop client for at least one of the application windows designated to receive the watermark further comprises:
   determining an above region for the application window by:
      identifying a plurality of application windows located above the application window in the GUI;
      for each of the plurality of above application windows, determining a corresponding window region corresponding to a region covered by the above application window;
      combining the determined window regions of the above application windows to produce the above region; and
   defining the uncovered watermark region to be a region of the designated watermark region that does not intersect the above region.

\* \* \* \* \*